(12) United States Patent
Sinha

(10) Patent No.: US 8,204,848 B2
(45) Date of Patent: Jun. 19, 2012

(54) DETECTING AND APPLYING DATABASE SCHEMA CHANGES TO REPORTS

(75) Inventor: Anand Sinha, Bangalore (IN)

(73) Assignee: Business Objects Software Limited, Dublin (IE)

( * ) Notice: Subject to any disclaimer, the term of this patent is extended or adjusted under 35 U.S.C. 154(b) by 187 days.

(21) Appl. No.: 12/619,698

(22) Filed: Nov. 17, 2009

(65) Prior Publication Data

US 2011/0119288 A1    May 19, 2011

(51) Int. Cl.
*G06F 17/30* (2006.01)
(52) U.S. Cl. ........................................ 707/600
(58) Field of Classification Search .............. 707/2, 102, 707/204, 600
See application file for complete search history.

(56) References Cited

U.S. PATENT DOCUMENTS

| | | | |
|---|---|---|---|
| 5,897,642 A | 4/1999 | Capossela et al. | |
| 6,405,212 B1 * | 6/2002 | Samu et al. | 1/1 |
| 2003/0163479 A1 * | 8/2003 | Mathews et al. | 707/102 |
| 2006/0101058 A1 * | 5/2006 | Chidlovskii | 707/102 |
| 2006/0195492 A1 * | 8/2006 | Clark et al. | 707/204 |
| 2007/0088733 A1 | 4/2007 | Bodge et al. | |
| 2008/0147704 A1 | 6/2008 | Godwin et al. | |
| 2009/0150396 A1 | 6/2009 | Elisha et al. | |

OTHER PUBLICATIONS

European Search Report for EP Application No. 10 014 628.1, mailed on Mar. 10, 2011, 6 pages.

* cited by examiner

*Primary Examiner* — Etienne Leroux

(57) ABSTRACT

A system and method to detect database schema changes are described. In various embodiments, a method of the embodiments detects database schema changes via triggers. In various embodiments, the changes are detected by comparing database schemas and determining modifications to database tables and database columns thereof. In various embodiments, the detected changes are applied to a report by generating a parse tree relevant for the modifications to database tables and columns; and traversing the tree to produce a statement to change the report to be relevant for the modifications to database tables and columns.

17 Claims, 8 Drawing Sheets

US 8,204,848 B2

DETECTING AND APPLYING DATABASE SCHEMA CHANGES TO REPORTS

FIELD OF THE INVENTION

The invention relates generally to collecting database data via reports, and, more specifically, to detecting and applying database schema changes to reports.

BACKGROUND OF THE INVENTION

An increasing number of organizations are adopting business intelligence solutions over relational databases. However, the schema of these relational databases may change and the changes may occur after a report has been created. When the schema of the underlying relational database changes, accessing or running the report will result in error.

A report collects database data from a database. To collect database data, a report relies on knowledge of the underlying database schema. The database schema represents the structure of the database, such as database table names, database column names, and other items, such as indexes, fields, relationships, and any other items that may be required to define how the data is stored in the database.

To obtain data from a database, a report requests the data via referencing database table names and columns. If the names change, or if any of the columns or tables are modified, the report will either result in an error, or will obtain incorrect data. If a report produces an error, the problem that caused the error may have to be analyzed and the report may have to be fixed manually.

SUMMARY OF THE INVENTION

These and other benefits and features of embodiments of the invention will be apparent upon consideration of the following detailed description of preferred embodiments thereof, presented in connection with the following drawings.

A method and system to detect and apply database schema changes to reports are described.

In various embodiments, a method of the embodiments detects database schema changes via comparing database states at various points in time.

In various embodiments, a method of the embodiments analyses the changes between database states to produce an instruction to apply to a report so that the report reflects the current database schema and state.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
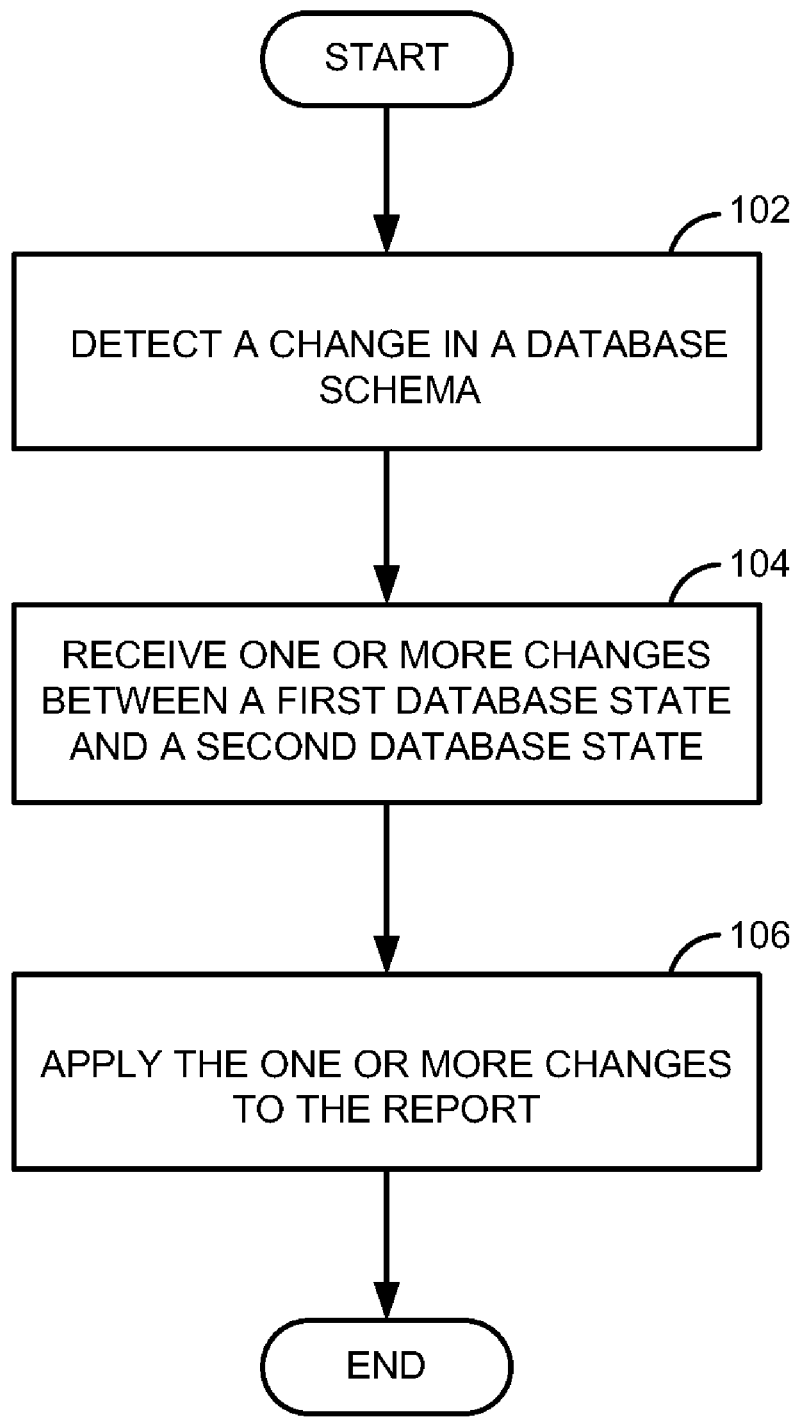
FIG. 1 is a flow diagram of an embodiment for applying database schema changes to a report.

Embodiments of techniques for detecting and applying database schema changes to reports are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, and customer and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data.

A relational data source is a form of structured data. A relational data source comprises a set of one or more tables. A table contains data about a set of entities that can be described by the same attributes. Tables comprise columns, or attributes, and rows, or records. A table must contain at least one column. A column indicates an attribute that can be used to describe each of the entities. A column definition may include the attribute name, type, size restriction, default value, and in some cases all of its possible values. A row indicates the set of attribute values—one attribute value for each column in the table—which describe a single entity. An unspecified attribute value can be indicated by a null value. A table has a primary key comprising a set of one or more attributes where the associated attribute value combination for each entity uniquely identifies that entity. Relationships between entities are expressed by linking, or cross-referencing, tables. For example, a column in a table may require that its values be selected from the values existing in a similar column of another table. Entities that share the same attribute value are related. Linking can be restricted based on cardinality. Common examples of cardinality are one-to-one, one-to-many and many-to-many. The data may be accessed, edited or supplemented using a query language such as Structured Query Language (SQL). Accessing the data can be done more efficiently by creating indexes on attributes.

A database schema is a formal definition of the structure of the database in a language supported by an underlying database management system. For example, a database schema may be defined in SQL or in XML. A database schema may define tables, columns, fields, relationships, views, indexes, packages, procedures, functions, queues, triggers and other elements.

Relational database tools are a subset of business intelligence tools. A popular language used to query relational databases is SQL or "structured query language". It is used in queries to create, modify, retrieve and manipulate data from relational databases. SQL has syntax rules and commands particularly suited for retrieval and filtering operations. The primary command is SELECT. This is used to retrieve zero or more rows from a database. There are many ancillary commands. These include the "FROM", "WHERE", "HAVING" and "ON" clauses. A "FROM" clause is used to indicate from where the data is to be taken. A "WHERE" clause identifies which rows to be retrieved. A "HAVING" clause is used to identify which of the grouped rows (e.g., grouped rows are produced by "GROUP BY" clause), are to be retrieved. A "GROUP BY" clause specifies the return of a list that is grouped by one or more columns.

In various embodiments, database schema changes may be detected, analyzed, and applied to a report.

In various embodiments, schema change detection may be performed utilizing a number of triggers provided by a database management system to detect the change. Such triggers may include, but are not limited to, data definition language (DDL) triggers and data manipulation language (DML) triggers.

In various embodiments, a change in the schema of a database may be detected by comparing a state of a database at a prior point in time to the state of a database at a later point in time.

In various embodiments, detecting changes in a database schema may be performed at regular or irregular time intervals.

In various embodiments, detecting changes in a database schema may be performed on demand.

In various embodiments, detecting changes in a database schema may be performed on demand after running a report has been unsuccessful and running the report has resulted in receiving an error message or error code.

In various embodiments, database schema changes may be analyzed to identify modifications to database tables and database table columns Such modifications may be stored for later use.

In various embodiments, database schema changes may be applied to reports so that when reports run, no errors are produced and reports generate accurate data.

In various embodiments, database schema changes may be applied to a report using Structured Query Language (SQL) statements such as, but not limited to, a "select" statement. In various embodiments, a select statement may be generated to reflect the modifications relevant for a report to reflect a database schema accurately.

FIG. 1 is a flow diagram of an embodiment for applying database schema changes to a report. Referring to FIG. 1, at process block 102, a change in a database schema is detected. In one embodiment, the change may be detected as a result of a trigger generating an event. In another embodiment, the change may be detected as a result of a comparison of a first database state to a second database state. In one embodiment, database states may be collected at regular or irregular time intervals. In another embodiment, a current database state may be recorded on demand.

At process block 104, changes between a first database state and a second database state are received. Such changes may include database tables being added to the schema, database tables being deleted from the schema, database tables being modified, or a combination of additions, deletions, and modifications to database tables. If modifications to database tables are received, such modifications may also involve additions, deletions, or modifications of database table columns.

At process block 106, the received changes are applied to the report. If the received changes include tables being added to the database schema, such changes may not be applied to the report because a report generated before the addition of the tables would not know of the tables and thus the addition of tables will not interfere with the report.

In various embodiments, if the received changes include deletions of tables, applying such changes may involve intervention by a database administrator to assure the report delivers data from the database as required.

If the changes include modifications of database tables and columns thereof, such modifications are applied to the report to ensure that the report retrieves data from the database as required. Applying received changes to a report ensures that end users of reports receive accurate data transparently. Thus, end users without technical knowledge of reports or underlying databases may obtain enterprise data as required, even if changes to underlying database schemas are made.

Figure 2:
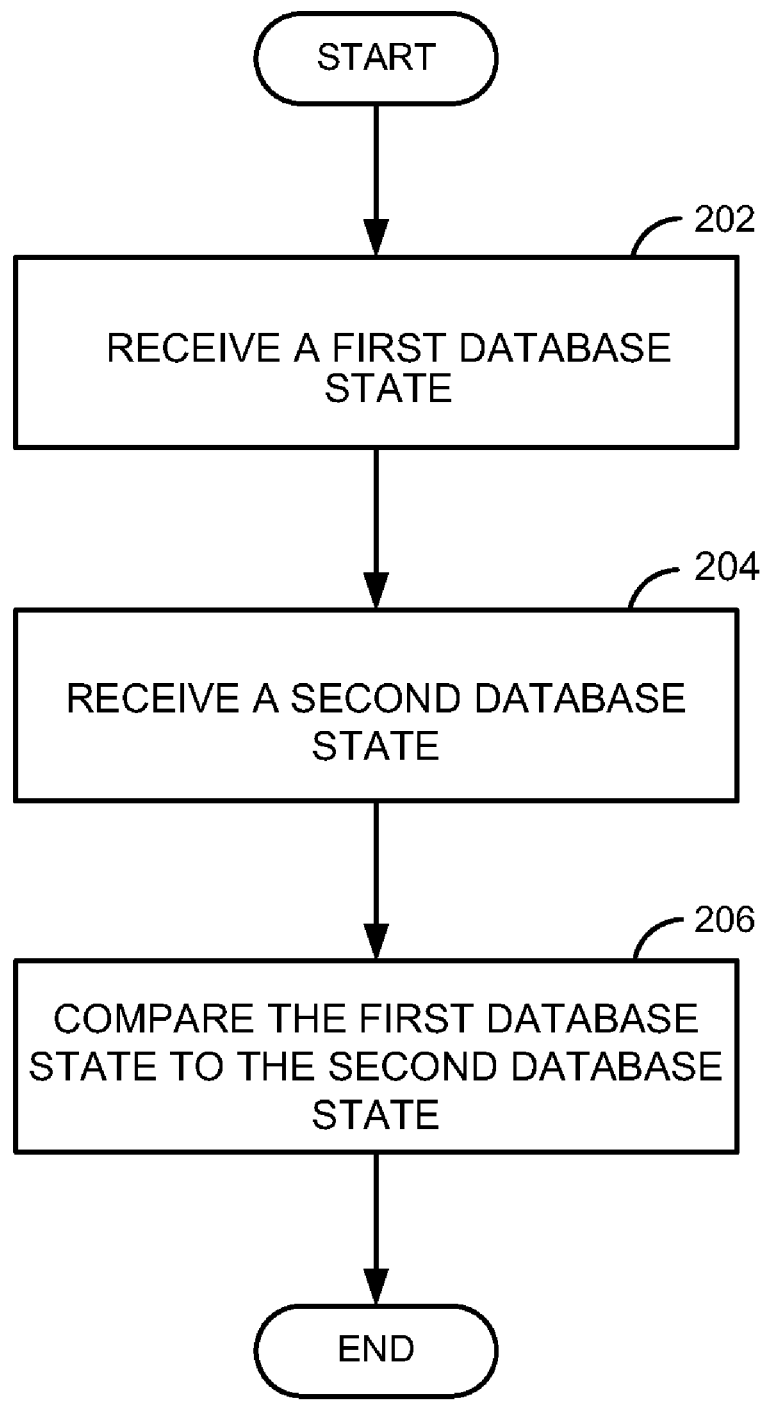
FIG. 2 is a flow diagram of an embodiment for detecting database schema changes.

FIG. 2 is a flow diagram of an embodiment for detecting database schema changes. Referring to FIG. 2, at process block 202, a first database state is received. The first database state may be recorded in a number of database tables and saved for later usage. At process block 204, a second database state is received. The second database state may be recorded in a number of database tables and saved for later usage. At process block 206, a comparison of the first database state to the second database state is performed. That is, the database tables storing the first database state are compared to the database tables storing the second database state. By comparing the two sets of database tables, it can be identified which tables and columns have been modified.

In various embodiments, a change in a database schema may be detected using a DDL trigger. DDL triggers respond to events corresponding to SQL statements using keywords such as "create", "alter", and "drop." Information related to the event that causes the trigger to occur may be stored in a database table Table 1 below shows one exemplary table storing information about events that serve as triggers.

TABLE 1

| Name of Column | Type of information Stored in Column |
| --- | --- |
| Timestamp | The timestamp column may store the time at which a change happened or was detected. |
| Operation | The Operation column may store the type of operation that caused the event, such as delete, rename, etc. |

TABLE 1-continued

| Name of Column | Type of information Stored in Column |
|---|---|
| Target Type | The target type column may store the target of the operation, that is, a table or a column in a table. |
| Target Name | The target name column may store the name of the table or table column that was the target of the operation. |
| Details | The Details column may store further information about the operation that caused the event, such as, but not limited to, an SQL statement that caused a change in the database schema. |
| Detail Type | The Detail Type column may store the type of information stored in the Details column, such as SQL statement, data type, etc. |

In various embodiments, a DML trigger may be used to detect a change in a database schema. In an exemplary embodiment, a DML trigger is used to capture changes in the schema in the database by monitoring so-called 'system tables', which are tables used in the database for administrative purposes, and such tables store names of tables and columns. DML triggers may be used to collect information when an add, update, or delete operation is detected on such a system table.

Figure 3:
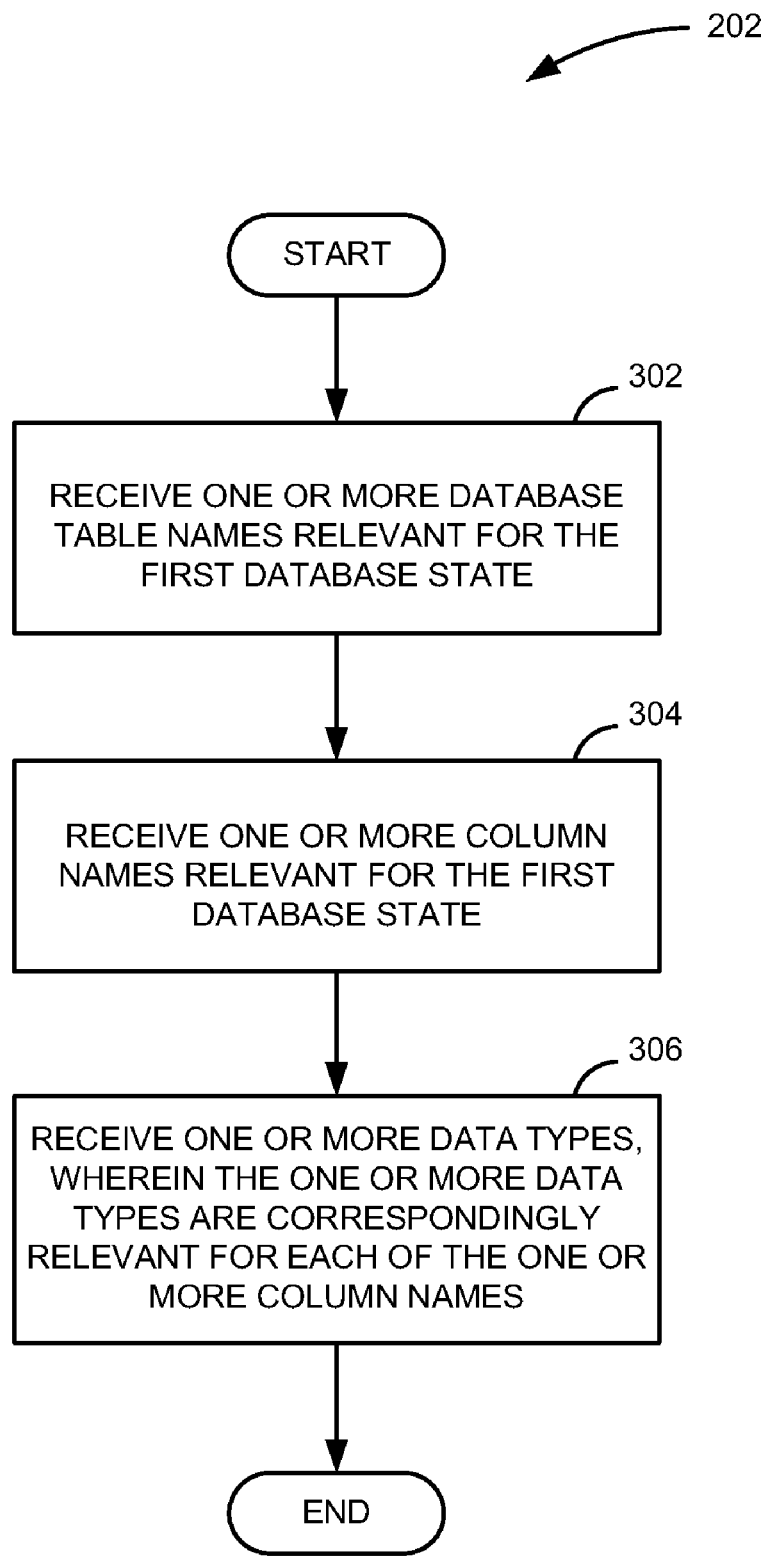
FIG. 3 is a flow diagram of an embodiment for receiving a first database state.

FIG. 3 is a flow diagram of an embodiment for receiving a first database state. In one embodiment, the method as described in FIG. 3 below may be used to receive a first database state as described in FIG. 2. Referring to FIG. 3, at block 302, table names in a database are stored in a first database table. The table names may be extracted from system tables in the database. At block 304, table column names are received in a second database table. At block 306, the data types of the columns are received in the second table. Thus, after blocks 302 through to 306, a 'snapshot' of the state of the database is generated. This 'snapshot' may be stored for later reference.

Figure 4:
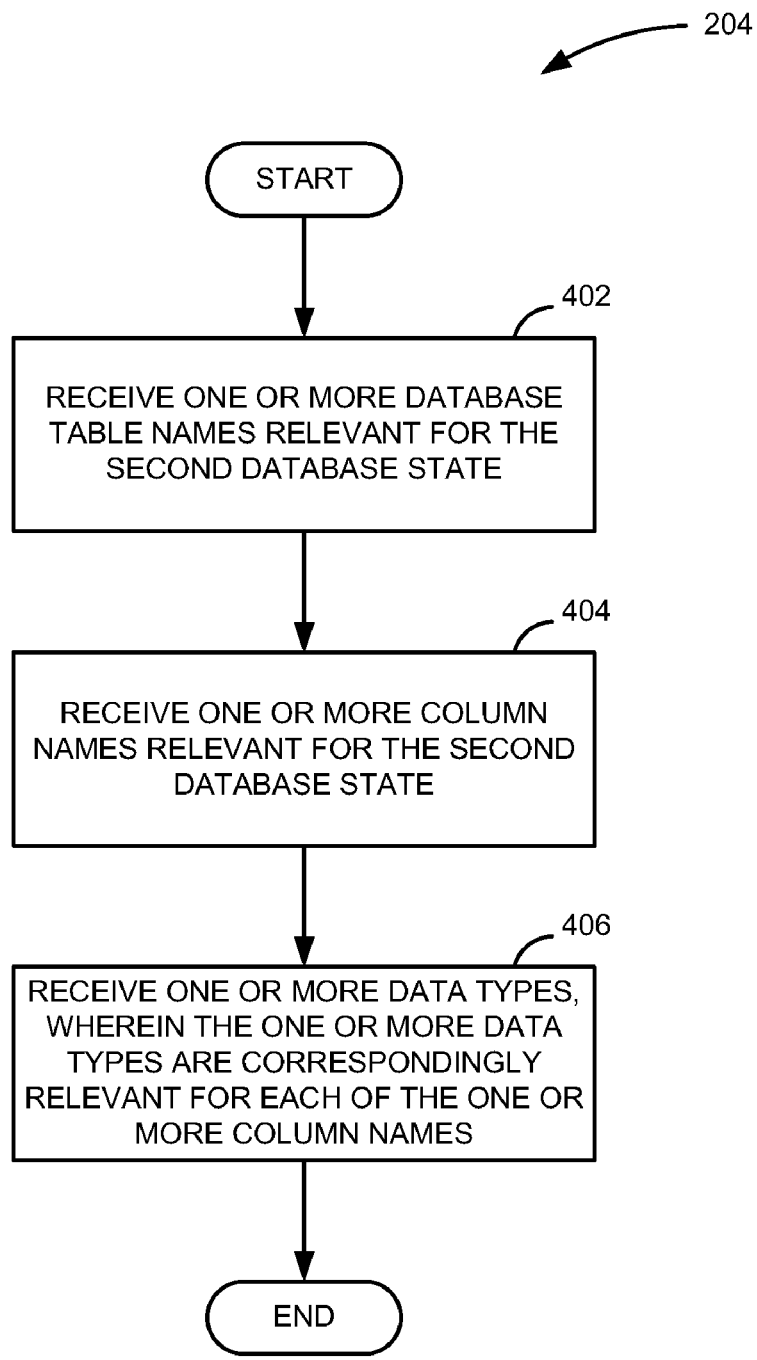
FIG. 4 is a flow diagram of an embodiment for receiving a second database state.

FIG. 4 is a flow diagram of an embodiment for receiving a second database state. In one embodiment, the method as described in FIG. 4 below may be used to receive a second database state as described in FIG. 2. Referring to FIG. 4, at block 402, table names in a database relevant for the second database state are stored in a first database table. The table names may be extracted from system tables in the database. At block 404, table column names relevant for the second database state are received in a second database table. At block 406, the data types of the columns are received in the second table. Thus, after blocks 402 through to 406, a 'snapshot' of the state of the database is generated for the point in time when it is recorded. This 'snapshot' may be stored for later reference. For example, 'snapshots' of the database state may be recorded periodically along with a timestamp value. Thus, at a later point a first database state may be compared to any of a number of stored database states.

In various embodiments, the method as described in FIGS. 2 through to 4 may be used to create a first set of tables for a first database state and a second set of tables for a second database state. A set of tables (e.g., one called "OrigNames_Tbl", and another called "OrigNames_Col") is created to store the state of database schema at a specified time. Either at periodic intervals, or on demand, another set of tables (e.g., one called "CurrNames_Tbl", and another called "CurrNames_Col") is created to store the state of the database schema. The second set is compared to the first set to obtain changes in the database schema between the two points in time. Such changes may include modifications of table names, column names, additions or deletions of tables and columns, and also modifications of data types for columns.

Table 2 below lists the tables for the comparison with the columns used to store information about the state of the database schema.

TABLE 2

| Table Name | Columns | Description of Column |
|---|---|---|
| OrigNames_Tbl | Name | The Name column stores the name of the table. |
| OrigNames_Col | Name | The Name column stores the fully qualified name of the column. |
| | Data type | The Data type column stores the type of data of the column. |
| CurrNames_Tbl | Name | The Name column stores the name of the table. |
| CurrNames_Col | Name | The Name column stores the fully qualified name of the column. |
| | Data type | The Data type column stores the type of data of the column. |

To fill the tables listed above with the appropriate information, a query may be generated to extract the information from system tables of the database.

Figure 5:
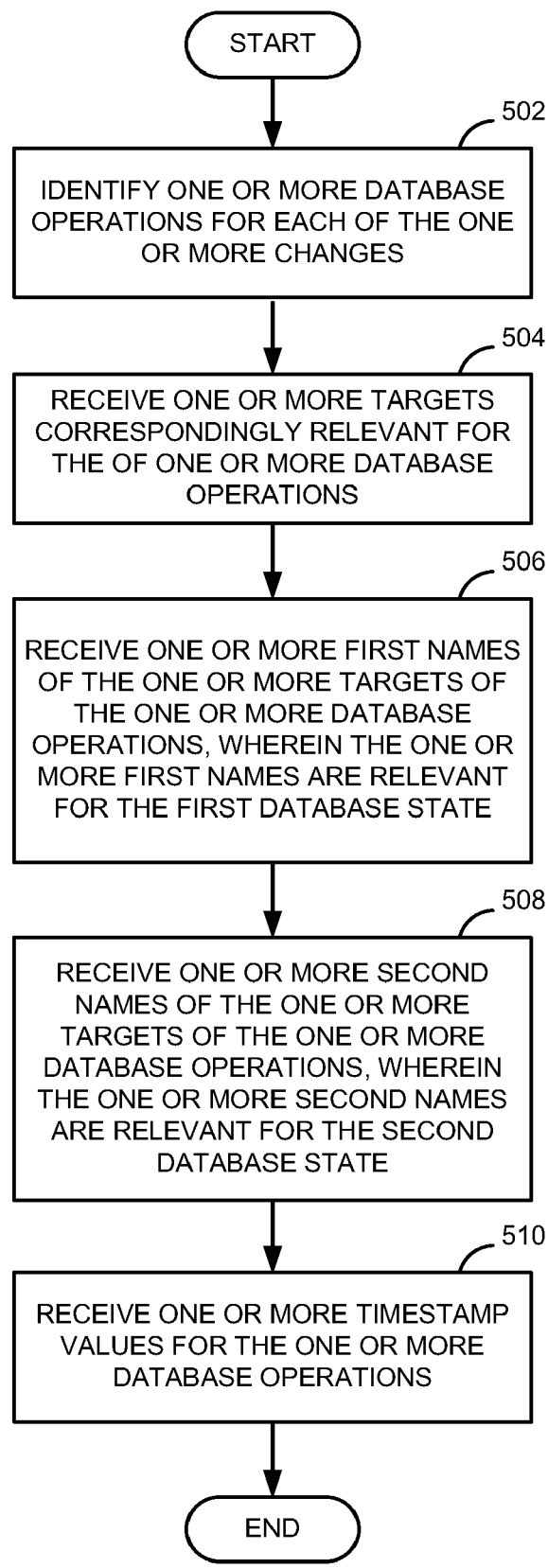
FIG. 5 is a flow diagram of an embodiment for receiving one or more changes between a first database state and a second database state.

FIG. 5 is a flow diagram of an embodiment for a method of receiving changes between a first database state and a second database state. Referring to FIG. 5, at process block 502, one or more database operations are identified as responsible for each change between a first database state and a second database state. At process block 504, one or more targets for the identified one or more database operations are received. At process block 506, one or more first names of the one or more targets of the identified one or more database operations are received. These first names are relevant for the first database state. At process block 508, one or more second names of the one or more targets of the one or more database operations are received. The one or more second names are relevant for the second state of the database. At process block 510, a timestamp value is received for each of the one or more database operations. Thus, after blocks 502 through 510, information about a change between a first database state and a second database state is received. Based on this information, a report may be changed so that the schema of the report is relevant for the second database state.

In various embodiments, the process as described in blocks 502 through to 510 may be repeated for each change between a first database state and a second database state. The information collected about each change may be stored in a dedicated table in a database. In various embodiments, an exemplary table such as Table 3 below may store details about database operations changing a database schema.

TABLE 3

| This column lists the time when the change was made (e.g., timestamp) | This column lists the operation that has made the change | This column lists the target of the operation that the change was made to | This column lists the name of the target | This column lists details about the operation | This column lists the type of detail |
|---|---|---|---|---|---|
| 0906220005 | DROP | TABLE | Table1 | | |
| 0906220005 | ADD | TABLE | Table10 | | |
| 0906220005 | DROP | COLUMN | Table1.a | INT | Data Type |
| 0906220005 | DROP | COLUMN | Table1.b | VARCHAR (20) | Data Type |
| 0906220005 | DROP | COLUMN | Table1.c | CHAR(4) | Data Type |
| 0906220005 | DROP | COLUMN | Table2.x | INT | Data Type |
| 0906220005 | ADD | COLUMN | Table10.a | INT | Data Type |
| 0906220005 | ADD | COLUMN | Table10.b | VARCHAR (20) | Data Type |
| 0906220005 | ADD | COLUMN | Table10.c | CHAR(4) | Data Type |
| 0906220005 | ADD | COLUMN | Table3.x | VARCHAR (10) | Data Type |
| 0904011256 | DROP | TABLE | Table4 | | |
| 0904011256 | DROP | COLUMN | Table4.p | INT | Data Type |
| 0904011256 | DROP | COLUMN | Table4.q | INT | Data Type |
| 0904011256 | DROP | COLUMN | Table4.r | CHAR(1) | Data Type |
| 0904011256 | DROP | COLUMN | Table4.s | CHAR(10) | Data Type |
| 0904011256 | DROP | COLUMN | Table6.a | CHAR(10) | Data Type |
| 0904011256 | ADD | COLUMN | Table6.b | CHAR(10) | Data Type |
| 0903043124 | ... | ... | ... | ... | ... |
| ... | ... | ... | ... | ... | ... |
| ... | ... | ... | ... | ... | ... |

In various embodiments, heuristics may be applied to determine the exact change or changes on the database schema. In various embodiments, an algorithm to identify changes between database states may look for strings that identify database operations. For example, if an underlying database uses SQL, an algorithm may look for "ADD" to specify that a table or column has been created in the database; and "DROP" to specify that a table or column has been deleted from the database. For example, if an exemplary Table called "X" with columns "a," "b," and "c" is deleted, it may be expected that a table containing the changes between a first database state and a second database state will have the following rows: one row with data (DROP, TABLE, X, ","), and three rows with the following data (DROP, COLUMN, X.a, Type1, 'DATATYPE') (DROP, COLUMN, X.b, Type2, 'DATATYPE'), and (DROP, COLUMN, X.c, Type3, 'DATATYPE').

In another embodiment, if an exemplary Table called "X" with columns "a," "b," and "c" is renamed to "Y", it may be expected that a table containing the changes between a first database state and a second database state will have the following rows: one row with data (DROP, TABLE, X, ","); and one row with data (ADD, TABLE, Y, ","). Further, there will be the following rows:
 (DROP, COLUMN, X.a, Type1, 'DATATYPE')
 (DROP, COLUMN, X.b, Type2, 'DATATYPE')
 (DROP, COLUMN, X.c, Type3, 'DATATYPE')
 (ADD, COLUMN, Y.a, Type1, 'DATATYPE')
 (ADD, COLUMN, Y.b, Type2, 'DATATYPE')
 (ADD, COLUMN, Y.c, Type3, 'DATATYPE')

In another embodiment, if an exemplary Table called "X" with columns "a," "b," and "c" is added to the database, it may be expected that a table containing the changes between a first database state and a second database state will have the following rows, as listed below.
 (ADD, TABLE, X, ",")
 (ADD, COLUMN, X.a, Type1, 'DATATYPE')
 (ADD, COLUMN, X.b, Type2, 'DATATYPE')
 (ADD, COLUMN, X.c, Type3, 'DATATYPE')

In another embodiment, if in an exemplary Table called "T" with columns "a," "b," and "c", column "a" is deleted, it may be expected that in a table containing the changes between a first database state and a second database state there will be a row with the following data: (DROP, COLUMN, T.a, Type1, 'DATATYPE').

In another embodiment, if in an exemplary Table called "T" column "a" is renamed to "b", it may be expected that in a table containing the changes between a first database state and a second database state there will be rows with the following data:
 (DROP, COLUMN, T.a, Type1, 'DATATYPE')
 (ADD, COLUMN, T.b, Type1, 'DATATYPE')

In another embodiment, if in an exemplary Table called "T", column "a" is added to the table, it may be expected that in a table containing the changes between a first database state and a second database state there will be a row with the following data: (ADD, COLUMN, T.a, Type1, 'DATATYPE').

Figure 6:
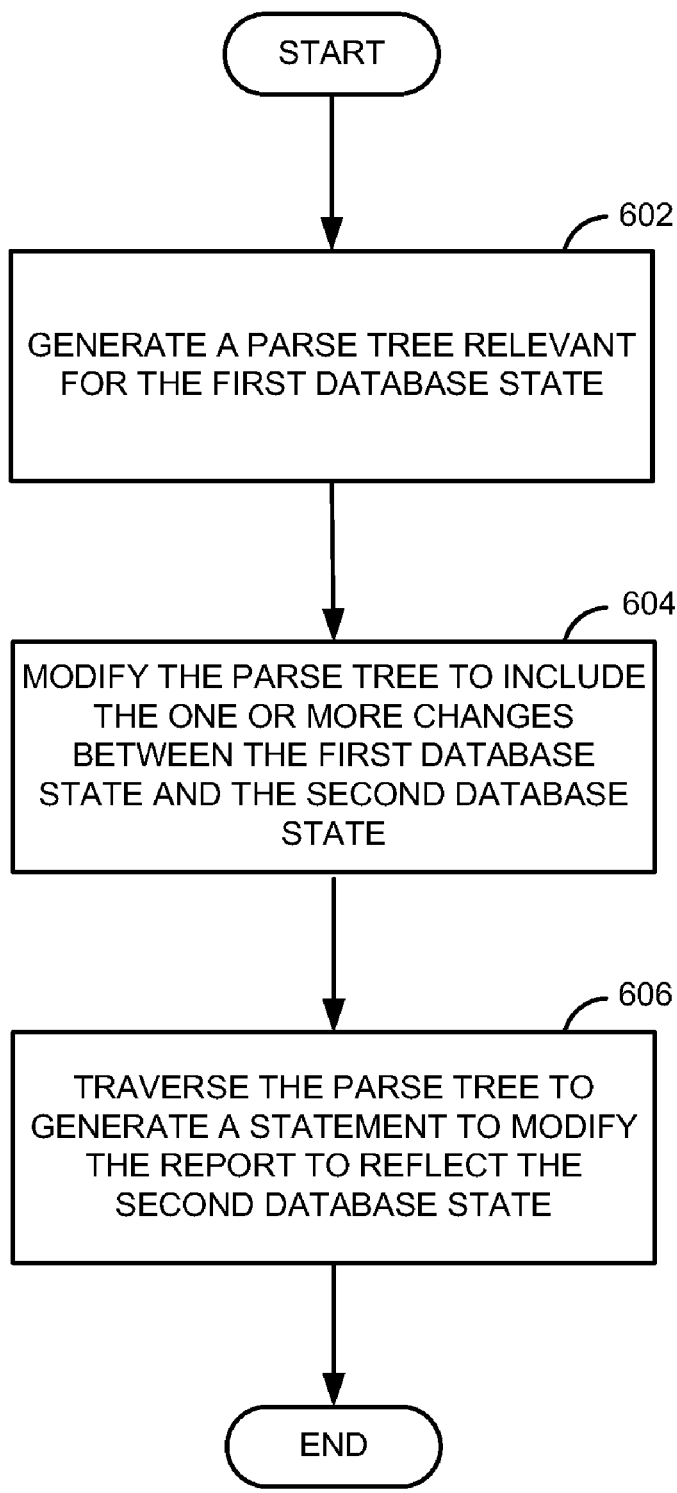
FIG. 6 is a flow diagram of an embodiment for applying one or more changes between a first database state and a second database state to a report.

FIG. 6 is a flow diagram of an embodiment of a method of applying a one or more changes between a first database state and a second database state to a report. To apply the changes between the first and second database states, SQL code may be generated from data collected in a table with changes between a first database state and a second database state. Referring to FIG. 6, at process block 602, a parse tree of an SQL select statement reflecting the first database state is generated. Typically, a parse tree is a logical construction that is an ordered tree representing the syntactic structure of a statement, expression, or string according to a formal grammar. The parse tree of process block 602 is an ordered three of a SELECT SQL statement where the following items are non-leaf nodes: subquery, the UNION key word which has only subquery nodes as children, and the INTERSECT key word which has only subquery nodes as children. The following items are non-significant leaf nodes: key words, punctuations marks, numeric values, and string constants. The following items are significant leaf nodes: fully qualified column names and table names with aliases. Following the grammar of the SQL SELECT statement and the considerations above, the parse tree to reflect the first database state are generated. Using the generated SQL SELECT statement, changes to the database schema are applied to the report.

At process block 604, the parse tree is modified with the changes between the first database state and the second database state. That is, the nodes and leaves of the parse are modified to reflect the second database state. For example, modifications to tables and columns will be reflected. At process block 606, the parse tree is traversed to generate the SQL SELECT statement to be applied to the report so that the report reflects the changes between the first database state and the second database state. By traversing the tree, each node and leaf is visited in a specific order to extract the information collected therein. As a result, all the pieces of information extracted from the tree produce the SQL SELECT statement to modify the report to reflect changes to the database schema.

Figure 7:
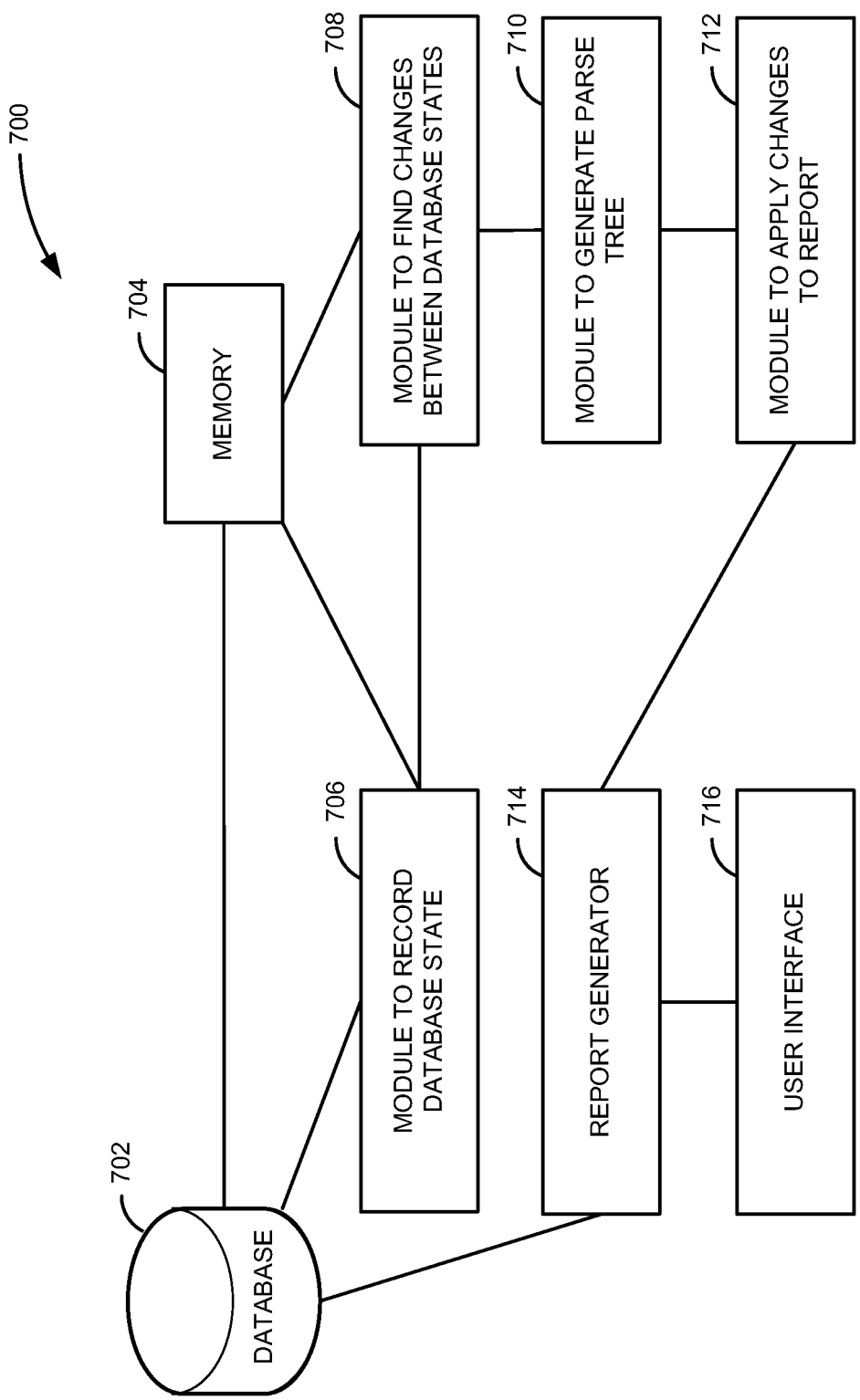
FIG. 7 is a block diagram of an embodiment for applying database schema changes to a report.

FIG. 7 is a block diagram of an embodiment for applying database schema changes to a report. Referring to FIG. 7, the system 700 includes a report generator 714 to generate a report from the database 702 and display enterprise data collected in the report in a user interface 716. Further, the system 700 includes a module to record database state 706 which communicates with a database 702 to record the state of the database 702. The module to record database state 706 may record the state of the database 702 periodically or on demand. The module to record database state 706 may also store the recorded state of the database 702 to the memory 704 for later reference. In various embodiments, the memory 704 may store a number of states for the database 702 and each state may be relevant for a specific point in time, as specified by a timestamp value included in the state. The module to find changes between database states 708 receives states of the database 702 and generates a list of changes between the states of the database 702. The module to generate parse tree 710 receives the changes as determined by the module to find changes between database states 708 and generates a parse tree of a SELECT SQL statement. The generated parse tree may be used by the module to apply changes to report 712 to apply the changes between the states of the database to a report. The module to apply changes to report 712 send the created SQL SELECT statement to the report generator 714 and thus the report correctly reflects changes to the database schema and enterprise data is displayed on the user interface 716 as required.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
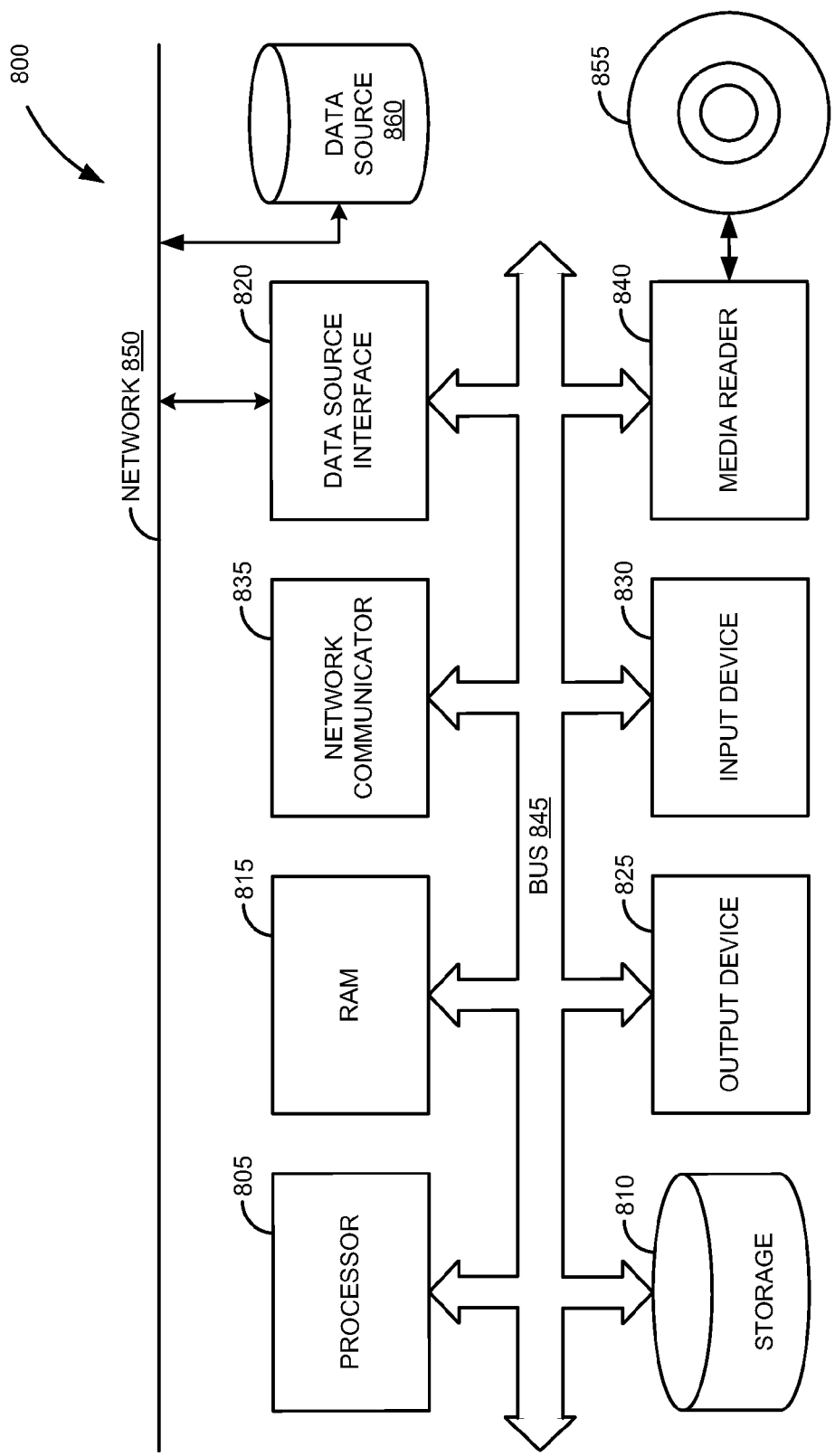
FIG. 8 is an exemplary block diagram of a system of an embodiment.

FIG. 8 is a block diagram of an exemplary computer system 800. The computer system 800 includes a processor 805 that executes software instructions or code stored on a computer readable medium 855 to perform the above-illustrated methods of the invention. The computer system 800 includes a media reader 840 to read the instructions from the computer readable medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be access via one or more abstraction layers implemented in hardware or software. For example, the data source 860 may be access by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, one or more reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A machine-readable storage device having machine readable instructions tangibly stored thereon which when executed by the machine, cause the machine to perform a method to apply database schema changes to a report, the method comprising:
   detecting a change in a database schema;
   receiving one or more changes between a first database schema relevant to a first database state and a second database schema relevant to a second database state; and
   applying the one or more changes to the report by:
      generating a parse tree having nodes and leaves relevant to the first database state, wherein the parse tree comprises syntactic structure of a first statement reflecting the first database state;
      modifying the generated parse tree to include the one or more changes between the first database schema and the second database schema by modifying the nodes and the leaves to reflect the second database state; and
      traversing the modified parse tree to generate a second statement to modify the report to reflect the second database schema relevant to the second database state.

2. The machine-readable storage device of claim 1, wherein detecting the change in the database schema comprises:
   receiving the first database state;
   receiving the second database state; and
   comparing the first database state to the second database state.

3. The machine-readable storage device of claim 2, wherein receiving the first database state comprises:
   receiving one or more table names relevant to the first database state;
   receiving one or more column names relevant to the first database state; and
   receiving one or more data types, wherein the one or more data types are correspondingly relevant to the one or more column names.

4. The machine-readable storage device of claim 2, wherein the operations further comprise generating a query to receive the first database state at one or more time intervals.

5. The machine-readable storage device of claim 2, wherein receiving the second database state comprises:
   receiving one or more table names relevant to the second database state;
   receiving one or more column names relevant to the second database state; and
   receiving one or more data types, wherein the one or more data types are correspondingly relevant to the one or more column names.

6. The machine-readable storage device of claim 2, wherein the operations further comprise generating a query to receive the second database state at one or more time intervals.

7. The machine-readable storage device of claim 1, wherein receiving the one or more changes comprises:
   identifying one or more database operations relevant to the one or more changes;
   receiving one or more targets correspondingly relevant to the one or more database operations;
   receiving one or more first names of the one or more targets of the one or more database operations, wherein the one or more first names are relevant to the first database state;
   receiving one or more second names of the one or more targets of the one or more database operations, wherein the one or more second names are relevant to the second database state; and
   receiving one or more timestamp values for the one or more database operations.

8. The machine-readable storage device of claim 1, wherein detecting the change in the database schema further comprises generating a data definition language trigger.

9. The machine-readable storage device of claim 1, wherein detecting the change in the database schema further comprises generating a data manipulation language trigger.

10. A computerized system including:
    a processor; and
    a memory in communication with the processor, the memory storing instructions related to:
       a module operable to receive one or more database states from a database;

a module operable to find one or more changes between a first database schema relevant to a first database state and a second database schema relevant to a second database state; and a module operable to apply the one or more changes to a report, wherein the module to apply the one or more changes to the report is operable to:

generate a parse tree having nodes and leaves relevant to the first database state, wherein the parse tree comprises syntactic structure of a first statement reflecting the first database state;

modify the generated parse tree to include the one or more changes between the first database schema and the second database schema by modifying the nodes and the leaves to reflect the second database state; and traverse the modified parse tree to generate a second statement to modify the report to reflect the second database schema relevant to the second database state.

11. The system of claim 10, wherein the module operable to receive the one or more database states from the database is further operable to receive the one or more database states periodically and store the one or more database states to the memory.

12. The system of claim 10, further comprising:
a report generator operable to receive and organize database data; and
a user interface operable to receive and display database data from the report generator.

13. A computerized method, comprising:
identifying one or more database operations relevant to one or more changes in a database schema;
identifying one or more targets of the one or more database operations; and
applying the one or more changes to the one or more targets in a report, by:
generating a parse tree having nodes and leaves relevant to a first database state, wherein the parse tree comprises syntactic structure of a first statement reflecting the first database state;
modifying the generated parse tree to include the one or more changes in the database schema by modifying the nodes and the leaves to reflect a second database state; and
traversing the modified parse tree to generate a second statement to modify the report to reflect the database schema relevant to the second database state.

14. The method of claim 13, further comprising:
receiving one or more first names of the one or more targets of the one or more database operations, wherein the one or more first names are relevant to the first database state; and
receiving one or more second names of the one or more targets of the one or more database operations, wherein the one or more second names are relevant to the second database state.

15. The method of claim 13, further comprising receiving one or more timestamp values for the one or more database operations.

16. The method of claim 13, further comprising recording the one or more changes in the database schema and storing the one or more changes to a memory.

17. The method of claim 16, further comprising retrieving the one or more changes form the memory to compare a first database schema relevant to the first database state to a second database schema relevant to the second database state.

* * * * *